United States Patent [19]

Köhler et al.

[11] Patent Number: 5,086,129
[45] Date of Patent: Feb. 4, 1992

[54] POLYARYLENE SULPHIDE MODIFIED WITH ARYL SULFONIC ACID CONTAINING AMINO OR HYDROXYL GROUP

[75] Inventors: Burkhard Köhler; Hans-Detlef Heinz, both of Krefeld-Uerdingen; Klaus Reinking, Bayerwerk, all of Fed. Rep. of Germany

[73] Assignee: Bayer Aktiengesellschaft, Leverkusen-Bayerwerk, Fed. Rep. of Germany

[21] Appl. No.: 570,858

[22] Filed: Aug. 22, 1990

[30] Foreign Application Priority Data

Sep. 2, 1989 [DE] Fed. Rep. of Germany ..... 39291717

[51] Int. Cl.$^5$ .............................................. C08G 75/16
[52] U.S. Cl. ..................................... 525/537; 528/388
[58] Field of Search .......................... 525/537; 528/388

[56] References Cited

U.S. PATENT DOCUMENTS 4,968,761 11/1990 Köhler et al. ...................... 525/537

FOREIGN PATENT DOCUMENTS 0193951 9/1986 European Pat. Off. .

Primary Examiner—Harold D. Anderson
Attorney, Agent, or Firm—Connolly and Hutz

[57] ABSTRACT

This invention relates to polyarylene sulphides, particularly polyphenylene sulphides, which are modified with hydroxyl or amino groups.

1 Claim, No Drawings

POLYARYLENE SULPHIDE MODIFIED WITH ARYL SULFONIC ACID CONTAINING AMINO OR HYDROXYL GROUP

This invention relates to polyarylene sulphides, particularly polyphenylene sulphides, which are modified with hydroxyl and/or amino groups.

Polyarylene sulphides containing functional groups are known (e.g. U.S. Pat. No. 3,354,129, Intern. J. Polymeric Mater. 11 (87) 263). Polyphenylene sulphide polymers and oligomers carrying functional end groups such as carboxyl, nitrile, etc. (telechelates) are also known (e.g. Polymer Bulletin 4 (81) 459, FR-A 2 470 780, DE-A 3 421 608 and DE-A 3 421 610).

Some of the polyarylene sulphides described which are modified with functional groups are difficult to prepare since they require the use of a monomer containing functional groups for the synthesis of the polymer. Such comonomers are liable to render synthesis more difficult, give rise to undesirable side reactions during the reaction or contaminate the circulations of the production process due to incomplete incorporation in the polymer chain.

The modification of polyarylene sulphides with OH and/or $NH_2$ groups is difficult to achieve in a polymerisation process because halogen-containing phenols and/or anilines interfere with the polymerisation reaction of the dihalogenobenzenes with the source of sulphur. Phenols are used as molecular weight regulators in the synthesis of polyarylene sulphides, e.g. DE-A 3 601 215.

It has now been found that polyarylene sulphides can be subsequently modified for the incorporation of OH and/or NH groups.

The present invention relates to the reaction products of polyarylene sulphides (PAS), preferably polyphenylene sulphides (PPS), which are prepared by the reaction of a) one or more dihalogenated aromatic compounds corresponding to formula (I), (II) and/or (III)

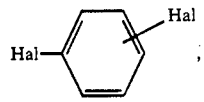   (I)

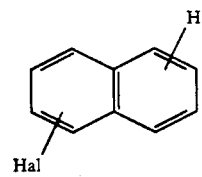   (II)

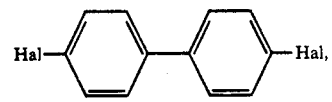   (III)

wherein Hal stands for fluorine, chlorine or bromine, preferably chlorine, b) from 0-5 mol-%, based on the sum of the dihalogenated aromatic compounds a), of a tri- or tetrahalogenated aromatic compound corresponding to formula (IV)

$$Ar^1Hal_n \quad (IV)$$

wherein $Ar^1$ stands for an aromatic $C_6-C_{14}$ group and Hal stands for fluorine, chlorine or bromine, preferably chlorine, and c) one or more sulphur donors corresponding to formula (V)

$$M_2S \quad (V)$$

wherein M stand for an alkali metal, preferably sodium or potassium, and the ratio of (a+b):c is in the range of from 0.75:1 to 1.15:1 d) in an organic solvent, preferably N-methylpyrrolidone or N-methylcaprolactam, optionally together with a catalyst, preferably caprolactam, alkali metal carboxylates and/or alkali metal salts of 6-amino- or 6-methylamino caproic acid, the molar ratio of c:d being in the range of from 1:2 to 1:15, with from 0.1 to 20% by weight, preferably from 0.7 to 5% by weight, of aromatic compounds containing OH or $NH_2$ groups corresponding to formula (VI)

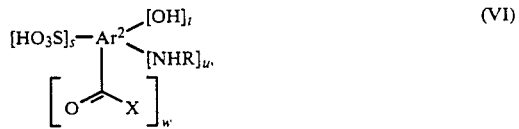   (VI)

wherein

R stands for hydrogen, a $C_1-C_{22}$-alkyl group which may be substituted by OH or $NH_2$ groups, a $C_1-C_{22}$-acyl group or a $C_6-C_{14}$-aryl group which may be substituted by OH or $NH_2$ groups, $Ar^2$ stands for an aromatic $C_6-C_{22}$-group which may be substituted by $C_1-C_{22}$-alkyl groups, nitro groups, nitroso groups or halogen (e.g. Cl, Br), s stands for 1, 2 or 3, t, u and w stand for 0, 1 or 2 and the sum of (s+t+u+w) is less than 6 and the sum of (t+u) is greater than or equal to 1 and X stands for an OR group or an NHR group, in which R has the meaning already indicated.

The reaction is carried out without solvent at temperatures ranging from above the melting point of the polyarylene sulphide to 450° C, optionally in an inert gas, preferably under shearing stress.

Polyarylene sulphides suitable for the purpose of this invention, which are preferably polyphenylene sulphides, are known, e.g. from EP-A 171 021 and U.S. Pat. No. 3,354,129, and are commercially available, e.g. as Tedur ® or Ryton ®.

The reaction may be carried out in kneaders or (screw shaft) extruders.

The following are examples of compounds corresponding to formula (VI) which may be used according to the invention: 2-, 3- and 4-Hydroxybenzene sulphonic acid, 2-hydroxy-5-nitrobenzene sulphonic acid, 5-chloro-2-hydroxy-3-nitrobenzene sulphonic acid, 3,5-dichloro-4-hydroxybenzene sulphonic acid, 4-hydroxy-3-nitrobenzene sulphonic acid, 1-hydroxy-2-naphthalene sulphonic acid, 4-hydroxy-2-naphthalene sulphonic acid, 4-hydroxy-1-naphthalene sulphonic acid, 5-hydroxy-1-naphthalene sulphonic acid, 5-hydroxy-2-naphthalene sulphonic acid, 8-hydroxy-2-naphthalene sulphonic acid, 8-hydroxy-1-naphthalene sulphonic acid, 5-hydroxy-1,6-naphthalene disulfonic acid, 4-hydroxy-2,7-naphthalene disulfonic acid, 4-chloro-5-hydroxy-2,7-naphthalene disulfonic acid, 4-hydroxy-2,6-naphthalene disulphonic acid, 8-hydroxy-1,6-naphthalene disulfonic acid, 4-hydroxy-1,5-naphthalene disulphonic acid, 3-hydroxy-1-naphthalene sulphonic acid, 3-hydroxy-7-nitro-1-naphthalene sulphonic acid, 6-hydroxy-1-naphthalene sulphonic acid, 6-hydroxy-2-naphthalene sulphonic acid, 7-hydroxy-2-naphthalene sulphonic acid, 4-hydroxy-1,3,5-naphthalene trisulphonic acid, 7-hydroxy-1-naphthalene sulphonic acid, 2-hydroxy-6-nitro-1,4-naphthalene disulphonic acid, 3-hydroxy-2,7-naphthalene disulphonic acid, 3-hydroxy-2,6-naphthalene disulphonic acid, 3-hydroxy-1,5-naphthalene disulphonic acid, 6-hydroxy-1,3-naphthalene disulphonic acid, 7-hydroxy-1,3-naphthalene disulphonic acid, 7-hydroxy-1,3,6-naphthalene trisulphonic acid, 6-hydroxy-1,3,8-pyrene trisulphonic acid, 4,8-dihydroxy-2,6-naphthalene disulphonic acid, 4,7-dihydroxy-2-naphthalene sulphonic acid, 4,6-dihydroxy-2-naphthalene sulphonic acid, 4,5-dihydroxy-2,7-naphthalene disulphonic acid, 6,7-dihydroxy-2-naphthalene sulphonic acid, 3,6-dihydroxy-2-naphthalene sulphonic acid, 3,6-dihydroxy-2,7-naphthalene disulphonic acid, 6,8-dihydroxy-1,3-pyrene disulphonic acid, 6-hydroxy-5-nitroso-2-naphthalene sulphonic acid, 2-hydroxy-5-sulphobenzoic acid, 4-hydroxy-2-sulphobenzoic acid, 1-hydroxy-4,7-disulpho-2-naphthalene carboxylic acid, 3-hydroxy-7-sulpho-2-naphthalene carboxylic acid, 3,5-dihydroxy-7-sulpho-2-naphthalene carboxylic acid, 2-aminobenzene sulphonic acid, 2-amino-5-chlorobenzene sulphonic acid, 2-amino-3,5-dichlorobenzene sulphonic acid, 2-amino-5-nitrobenzene sulphonic acid, 2-amino-3,5-dinitrobenzene sulphonic acid, 3-aminobenzene sulphonic acid, 3-amino-4-chlorobenzene sulphonic acid, 5-amino-2-chlorobenzene sulphonic acid, 2-amino-2,4,5-trichlorobenzene sulphonic acid, 5-amino-2-nitrobenzene sulphonic acid, 4-aminobenzene sulphonic acid, 4-(phenylamino)benzene sulphonic acid, 4-(benzylamino)benzene sulphonic acid, N-(2-amino-4-nitrophenyl)-sulphanilic acid, 4-amino-2-nitrobenzene sulphonic acid, 4-amino-3-nitrobenzene sulphonic acid, 4-amino-3,5-dinitrobenzene sulphonic acid, 2,4-diaminobenzene sulphonic acid, 2,5-diamino benzene sulphonic acid, 5-amino-2-(phenylamino)benzene sulphonic acid, N,N'-bis-(4-amino-2-sulphophenyl)-p-phenylene diamine, 5-amino-2-(4-aminophenyl)aminobenzene sulphonic acid, 3-amino-4-(phenylamino)benzene sulphonic acid, 5-amino-2-methylbenzene sulphonic acid, 2-amino-5-chloro-3-methyl-benzene sulphonic acid, 2,4-diamino-5-methylbenzene sulphonic acid, 3-amino-4-methylbenzene sulphonic acid, 2-amino-3,5-dimethylbenzene sulphonic acid, 2-amino-1-naphthalene sulphonic acid, 4-amino-1-naphthalene sulphonic acid, 5-amino-1-naphthalene sulphonic acid, 5-amino-8-nitro-1-naphthalene sulphonic acid, 6-amino-1-naphthalene sulphonic acid, 7-amino-1-naphthalene sulphonic acid, 7-amino-5-nitro-1-naphthalene sulphonic acid, 8-amino-1-naphthalene sulphonic acid, 1-amino-2-naphthalene sulphonic acid, 5-amino-2-naphthalene sulphonic acid, 6-amino-2-naphthalene sulphonic acid, 7-(methylamino)-2-naphthalene sulphonic acid, benzidine-3-sulphonic acid, aniline-3,5-disulphonic acid, 4,6-diamino-1,3-benzene disulphonic acid, 3-amino-1,5-naphthalene disulphonic acid, 3-amino-7-nitro-1,5-naphthalene disulphonic acid, 4,5-diamino-2,7-naphthalene disulphonic acid, benzidine-2,2'-disulphonic acid, 5-amino-2-hydroxybenzene sulphonic acid, 5-amino-2-hydroxy-3-nitro-benzene sulphonic acid, 3-amino-4-hydroxybenzene sulphonic acid, 7-amino-4-hydroxy-2-naphthalene sulphonic acid, 4-amino-5-hydroxy-1,7-naphthalene disulphonic acid, 8-amino-1-naphthol-3,6-disulphonic acid, 4-amino-5-hydroxy-1,3-naphthalene disulphonic acid, 5-sulphoanthranilic acid, 5-sulpho-N-methyl-anthranilic acid, 5-amino-2-hydroxy-3-sulphobenzoic acid and the N-acetyl compounds of the amino compounds listed above.

The reaction products according to the invention are suitable, for example, as alloying partners for other thermoplasts. They may be used for the manufacture of shaped products either on their own or as mixtures with conventional fillers and/or other polymers.

EXAMPLES

EXAMPLE 1

A mixture of 98% of a polyparaphenylene sulphide (PPS) having a melt viscosity of 40 Pa.s (306° C., 1000 I/s) and 2% of 4-hydroxy-1-naphthalene sulphonic acid is extruded at 320° C. from a double shaft extruder ZSK 32 of Werner and Pfleiderer.

EXAMPLE 2

A mixture of 98% of PPS and 2% of 3-amino-4-hydroxybenzene sulphonic acid is extruded analogously to Example 1.

EXAMPLE 3

A mixture of 98% PPS and 2% of 4-aminobenzene sulphonic acid (sulphanilic acid) is extruded analogously to Example 1.

At the most 5% by weight of the sulphonic acid put into the process can be extracted from the reaction products according to the invention by means of water or dioxane.

We claim:

1. Reaction product of polyarylene sulphide prepared by the reaction of
   a) one or more dihalogenated aromatic compounds corresponding to formula selected from the group consisting of (I), (II) and (III)

(I)

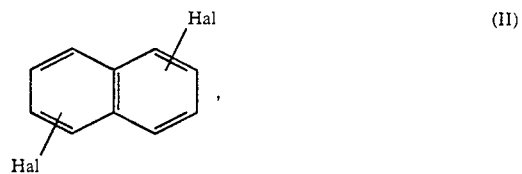

(II)

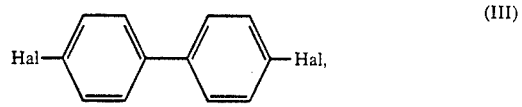

(III)

wherein Hal represents fluorine, chlorine or bromine, b) from 0–5 mol-%, based on a), of a tri- or tetrahalogenated aromatic compound corresponding to formula (IV)

$$Ar^1Hal_n \qquad (IV),$$

wherein Ar$^1$ represents an aromatic C$_6$-C$_{14}$ group and Hal represents fluorine, chlorine or bromine and c) one or more sulphur donors corresponding to formula (V)

$$M_2S \qquad (V)$$

wherein M represents sodium or potassium and the ratio of (a+b):c is in the range of from 0.75:1 to 1.15:1 d) in an organic solvent, optionally with the addition of a catalyst or the alkali metal salts of 6-amino or 6-methylamino caproic acid, the molar ratio of c:d being in the range of from 1:2 to 1:15, with from 0.1 to 20% by weight of at least one aromatic compound containing OH or NH$_2$ and corresponding to formula (VI)

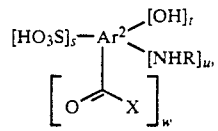

wherein
- R represents hydrogen, C$_1$-C$_{22}$-alkyl which is unsubstituted or substituted by OH or NH$_2$ groups, C$_1$-C$_{22}$-acyl or C$_6$-C$_{14}$-aryl which is unsubstituted or substituted by OH or NH$_2$,
- Ar$^2$ represents an aromatic C$_6$-C$_{22}$ which is unsubstituted or substituted by C$_1$-C$_{22}$-alkyl, nitro, nitroso or halogen,
- s represents the number 1, 2 or 3,
- t, u and w represent 0, 1 or 2, and the sum of (s+t+u+w) is less than 6 and the sum of (t+u) is greater than or equal to 1 and
- X represents OR or NHR, wherein R is defined above.

* * * * *